United States Patent
Shi et al.

(10) Patent No.: US 11,408,960 B2
(45) Date of Patent: Aug. 9, 2022

(54) TWO-DIMENSIONAL DIRECTION-OF-ARRIVAL ESTIMATION METHOD FOR COPRIME PLANAR ARRAY BASED ON STRUCTURED COARRAY TENSOR PROCESSING

(71) Applicant: ZHEJIANG UNIVERSITY, Hangzhou (CN)

(72) Inventors: Zhiguo Shi, Hangzhou (CN); Hang Zheng, Hangzhou (CN); Chengwei Zhou, Hangzhou (CN); Jiming Chen, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/401,345

(22) Filed: Aug. 13, 2021

(65) Prior Publication Data
US 2021/0373113 A1    Dec. 2, 2021

Related U.S. Application Data (63) Continuation of application No. PCT/CN2020/088569, filed on May 3, 2020.

(51) Int. Cl.
G01S 3/14 (2006.01)
G01S 3/04 (2006.01)

(52) U.S. Cl.
CPC ............... *G01S 3/14* (2013.01); *G01S 3/043* (2013.01)

(58) Field of Classification Search
CPC ... G01S 3/14; G01S 7/42; G01S 13/88; G01S 2013/0254; G01S 3/043; G01S 5/00; G01S 13/003
See application file for complete search history.

(56) References Cited

U.S. PATENT DOCUMENTS

2003/0058153 A1    3/2003  Yu
2016/0172767 A1*   6/2016  Ray ............... H01Q 21/22
                                            343/893
(Continued)

FOREIGN PATENT DOCUMENTS

CN          104749552 A        7/2015
CN          106226729 A        12/2016
(Continued)

OTHER PUBLICATIONS

C. Zhou, Y. Gu, X. Fan, Z. Shi, G. Mao and Y. D. Zhang, "Direction-of-Arrival Estimation for Coprime Array via Virtual Array Interpolation," in IEEE Transactions on Signal Processing, vol. 66, No. 22, pp. 5956-5971, 15 Nov. 15, 2018, doi: 10.1109/TSP.2018.2872012. (Year: 2018).*

(Continued)

*Primary Examiner* — Olumide Ajibade Akonai
(74) *Attorney, Agent, or Firm* — W&G Law Group (57) ABSTRACT

A two-dimensional direction-of-arrival estimation method for a coprime planar array based on structured coarray tensor processing, the method includes: deploying a coprime planar array; modeling a tensor of the received signals; deriving the second-order equivalent signals of an augmented virtual array based on cross-correlation tensor transformation; deploying a three-dimensional coarray tensor of the virtual array; deploying a five-dimensional coarray tensor based on a coarray tensor dimension extension strategy; forming a structured coarray tensor including three-dimensional spatial information; and achieving two-dimensional direction-of-arrival estimation through CANDECOMP/PARACFAC decomposition. The present disclosure constructs a processing framework of a structured coarray tensor based on statistical analysis of coprime planar array tensor signals, to achieve multi-source two-dimensional direction-of-arrival estimation in the underdetermined case on the basis of (Continued)

ensuring the performance such as resolution and estimation accuracy, and can be used for multi-target positioning.

6 Claims, 5 Drawing Sheets

(56) References Cited

U.S. PATENT DOCUMENTS

2019/0129026 A1* 5/2019 Sumi .................... G01S 7/52039
2021/0364564 A1* 11/2021 Chen .................... G06K 9/6205

FOREIGN PATENT DOCUMENTS

| CN | 106896340 A | 6/2017 |
| CN | 107037392 A | 8/2017 |
| CN | 107102291 A | 8/2017 |
| CN | 108344967 A | 7/2018 |
| CN | 109143152 A | 1/2019 |
| CN | 109471086 A | 3/2019 |
| CN | 110927661 A | 3/2020 |
| JP | 2017116425 A | 6/2017 |

OTHER PUBLICATIONS

Y. D. Zhang, S. Qin and M. G. Amin, "Doa estimation exploiting coprime arrays with sparse sensor spacing," 2014 IEEE International Conference on Acoustics, Speech and Signal Processing (ICASSP), 2014, pp. 2267-2271, doi: 10.1109/ICASSP.2014.6854003. (Year: 2014).*

P. P. Vaidyanathan and P. Pal, "Sparse Sensing With Co-Prime Samplers and Arrays," in IEEE Transactions on Signal Processing, vol. 59, No. 2, pp. 573-586, Feb. 2011, doi: 10.1109/TSP.2010.2089682. (Year: 2011).*

T. Jia, H. Wang, X. Shen and X. Liu, "Direction of arrival estimation with co-prime arrays via compressed sensing methods," OCEANS 2016—Shanghai, 2016, pp. 1-5, doi: 10.1109/OCEANSAP.2016.7485484. (Year: 2016).*

International Search Report (PCT/CN2020/088569); dated Feb. 1, 2021.

JP First Office Action (2021-541669); dated Jan. 5, 2022.

* cited by examiner

TWO-DIMENSIONAL DIRECTION-OF-ARRIVAL ESTIMATION METHOD FOR COPRIME PLANAR ARRAY BASED ON STRUCTURED COARRAY TENSOR PROCESSING

TECHNICAL FIELD

The present disclosure belongs to the field of array signal processing technologies, and in particular, to a two-dimensional direction-of-arrival estimation method for a coprime planar array based on structured coarray tensor signal processing, and can be used for multi-target positioning.

BACKGROUND

As a typical systematic sparse array architecture, a coprime array can break through the bottleneck of traditional uniform arrays with a limited degrees-of-freedom. In order to increase the degrees-of-freedom, the received signals of the coprime array are generally derived into an augmented virtual array, and the corresponding coarray signals are used for the subsequent processing. In order to improve the degree of freedom for two-dimensional direction-of-arrival estimation, much attention has been paid to the two-dimensional coarray signal processing. In a traditional two-dimensional direction-of-arrival estimation method with the coprime planar array, a common approach is to derive coarray signals by vectorizing the second-order correlation statistics of the coprime array, and then extend the one-dimensional direction-of-arrival estimation method to a two-dimensional/high-dimensional scenarios, so as to achieve direction-of-arrival estimation through further coarray processing. The above approach destroys the multidimensional the original structure of the signals received by the coprime planar array, and the coarray signals derived from vectorization encounter the challenge of large scale and loss of structural information.

Tensor as a multidimensional data format, can be used to preserve the characteristics of the multidimensional signals. For feature analysis of multidimensional signals, high-order singular value decomposition and tensor decomposition methods provide abundant mathematical tools for tensor-based signal processing. In recent years, tensor has been widely applied in array signal processing, image signal processing, statistics, and other fields. Therefore, by using a tensor to represent the received signals of a coprime planar array and the corresponding coarray signals, the multidimensional structural information of signals can be retained effectively, which provides an important theoretical tool for improving the performance of direction-of-arrival estimation. At the same time, it is expected to achieve a breakthrough in the comprehensive performance of direction-of-arrival estimation in terms of resolution, estimation accuracy, and degree of freedom by extending the high-order singular value decomposition and tensor decomposition methods to the coarray domain. However, the coarray tensor-based processing for the coprime planar array has not been discussed in the existing methods, and two-dimensional coarray properties of the coprime planar array are not utilized. Therefore, it is an important problem urgently to be solved to design a direction-of-arrival estimation method with an enhanced degree of freedom based on the coprime planar array tensor model so as to achieve accurate direction-of-arrival estimation in the underdetermined case.

SUMMARY

An objective of the present disclosure is to provide a two-dimensional direction-of-arrival estimation method for a coprime planar array based on structured coarray tensor processing with respect to the problem of loss of degrees-of-freedom in the existing methods, which provides an effective solution for establishing a relationship between the two-dimensional coarray and the tensor-based signals received by the coprime planar array, fully mining structural information of the two-dimensional coarray, and using structured coarray tensor construction and coarray tensor decomposition to achieve two-dimensional direction-of-arrival estimation in the underdetermined case.

The objective of the present disclosure is achieved through the following technical solution: a two-dimensional direction-of-arrival estimation method for a coprime planar array based on structured coarray tensor processing, including the following steps:

(1) deploying a coprime planar array with $4 M_x M_y + N_x N_y - 1$ physical sensors; wherein $M_x$, $N_x$ and $M_y$, $N_y$ are a pair of coprime integers respectively, and $M_x < N_x$, $M_y < N_y$; the coprime planar array can be decomposed into two sparse uniform subarrays $\mathbb{V}_1$ and $\mathbb{V}_2$;

(2) assuming that there are K far-field narrowband incoherent sources from directions $\{(\theta_1, \varphi_1), (\theta_2, \varphi_2), \ldots, (\theta_K, \varphi_K)\}$, the received signal of the sparse uniform subarray $\mathbb{V}_1$ of the coprime planar array can be expressed as a three-dimensional tensor $\mathcal{X}_1 \in \mathbb{C}^{2M_x \times 2M_y \times L}$ (L denotes the number of snapshots):

$$\mathcal{X}_1 = \sum_{k=1}^{K} a_{Mx}(\theta_k, \varphi_k) \circ a_{My}(\theta_k, \varphi_k) \circ s_k + \mathcal{N}_1,$$

where $s_k = [s_{k,1}, s_{k,2}, \ldots, s_{k,L}]^T$ denotes a signal waveform corresponding to the $k^{th}$ source, $[\bullet]^T$ denotes a transpose operation, $\circ$ denotes an exterior product of vectors, $\mathcal{N}_1$ denotes an additive Gaussian white noise tensor, and $a_{Mx}(\theta_k, \varphi_k)$ and $a_{My}(\theta_k, \varphi_k)$ denote the steering vectors of $\mathbb{V}_1$ along the x-axis and the y-axis, respectively. $a_{Mx}(\theta_k, \varphi_k)$ and $a_{My}(\theta_k, \varphi_k)$ are defined as:

$$a_{Mx}(\theta_k, \varphi_k) = \left[1, e^{-j\pi u_1^{(2)} \sin(\varphi_k)\cos(\theta_k)}, \ldots, e^{-j\pi u_1^{(2M_x)} \sin(\varphi_k)\cos(\theta_k)}\right]^T,$$

$$a_{My}(\theta_k, \varphi_k) = \left[1, e^{-j\pi v_1^{(2)} \sin(\varphi_k)\sin(\theta_k)}, \ldots, e^{-j\pi v_1^{(2M_y)} \sin(\varphi_k)\sin(\theta_k)}\right]^T,$$

where $u_1^{(i_1)}$ ($i_1 = 1, 2, \ldots, 2M_x$) and $v_1^{(i_2)}$ ($i_2 = 1, 2, \ldots, 2M_y$) denote the positions of the $i_1^{th}$ and $i_2^{th}$ sensor in the sparse subarray $\mathbb{V}_1$ along the x-axis and the y-axis with $u_1^{(1)} = 0$, $v_1^{(1)} = 0$, $j = \sqrt{-1}$;

denoting the received signals of the sparse uniform subarray $\mathbb{V}_2$ by another three-dimensional tensor $\mathcal{X}_2 \in \mathbb{C}^{N_x \times N_y \times L}$:

$$\mathcal{X}_2 = \sum_{k=1}^{K} a_{Nx}(\theta_k, \varphi_k) \circ a_{Ny}(\theta_k, \varphi_k) \circ S_k + \mathcal{N}_2,$$

where $\mathcal{N}_2$ denotes a noise tensor, and $a_{Nx}(\theta_k, \varphi_k)$ and $a_{Ny}(\theta_k, \varphi_k)$ denote the steering vectors of $\mathbb{V}_2$ along the x-axis and the y-axis respectively, which are defined as:

$$a_{N_x}(\theta_k, \varphi_k) = \left[1, e^{-j\pi u_2^{(2)} sin(\varphi_k)cos(\theta_k)}, \ldots, e^{-j\pi u_2^{(2N_x)} sin(\varphi_k)cos(\theta_k)}\right]^T,$$

$$a_{N_y}(\theta_k, \varphi_k) = \left[1, e^{-j\pi v_2^{(2)} sin(\varphi_k)sin(\theta_k)}, \ldots, e^{-j\pi v_2^{(2N_y)} sin(\varphi_k)sin(\theta_k)}\right]^T,$$

where $u_2^{(i_3)}$ ($i_3$=1, 2, ..., $N_x$) and $v_2^{(i_4)}$ ($i_4$=1, 2, ..., $N_y$) denote the positions of the $i_3^{th}$ and $i_4^{th}$ sensor in the sparse subarray $\mathbb{V}_2$ along the x-axis and the y-axis with $u_2^{(1)}$=0, $v_2^{(1)}$=0;

calculating the second-order cross-correlation tensor $\hat{\mathcal{R}} \in \mathbb{C}^{2M_x \times 2M_y \times N_x \times N_y}$ of the two three-dimensional tensor signals $\mathcal{X}_1$ and $\mathcal{X}_2$:

$$\hat{\mathcal{R}} = \frac{1}{L}\sum_{l=1}^{L}\mathcal{X}_1(l) \circ \mathcal{X}_2^*(l),$$

where $\mathcal{X}_1(l)$ and $\mathcal{X}_2(l)$ denote the $l^{th}$ slice of $\mathcal{X}_1$ and $\mathcal{X}_2$ along the third dimension (i.e., temporal dimension) respectively, and $(\cdot)^*$ denotes a conjugate operation;

(3) deriving an augmented discontinuous virtual planar array $\mathcal{S}$ from the cross-correlation tensor $\hat{\mathcal{R}}$, where the position of each virtual sensor can be defined as:

$$\mathcal{S} = \{(M_x n_x d + N_x m_x d, -M_y n_y d + N_y m_y d)|0 \leq n_x \leq N_x-1,$$
$$0 \leq m_x \leq 2M_x-1, 0 \leq n_y \leq N_y-1, 0 \leq m_y \leq 2M_y-1\},$$

where the spacing d is set to half of the signal wavelength $\lambda$, i.e., d=$\lambda$/2; $\mathcal{S}$ contains a virtual uniform planar array $\mathcal{W}$ including $(M_x N_x + M_x + N_x - 1) \times (M_y N_y + M_y + N_y - 1)$ virtual sensors with distributing from $(-N_x+1)$d to $(M_x N_x + M_x - 1)$d in the x-axis and from $(-N_y+1)$d to $(M_y N_y + M_y - 1)$d in the y-axis, which is defined as:

$$\mathcal{W} = \{(x,y)|x=p_x d, y=p_y d, -N_x+1 \leq p_x \leq M_x N_x + M_x - 1,$$
$$-N_y + 1 \leq p_y \leq M_y N_y + M_y - 1\},$$

defining dimension sets $\mathbb{J}_1 = \{1, 3\}$ and $\mathbb{J}_2 = \{2, 4\}$, and reshaping the cross-correlation tensor $\mathcal{R}$ (noiseless scene) with $\{\mathbb{J}_1, \mathbb{J}_2\}$ to obtain an equivalent second-order signal $U \in \mathbb{C}^{2M_x N_x \times 2M_y N_y}$ of the augmented virtual planar array $\mathcal{S}$, which is ideally modeled as:

$$U \triangleq \mathcal{R}_{\{\mathbb{J}_1, \mathbb{J}_2\}} = \sum_{k=1}^{K} \sigma_k^2 a_x(\theta_k, \varphi_k) \circ a_y(\theta_k, \varphi_k),$$

where $a_x(\theta_k, \varphi_k) = a^*_{N_x}(\theta_k, \varphi_k) \otimes a_{M_x}(\theta_k, \varphi_k)$, $a_y(\theta_k, \varphi_k) = a^*_{N_y}(\theta_k, \varphi_k) a_{M_y}(\theta_k, \varphi_k)$ denote steering vectors of the augmented virtual planar array $\mathcal{S}$ along the x axis and the y axis, $\sigma_k^2$ denotes power of a $k^{th}$ source, and $\otimes$ denotes Kroneker product; the equivalent signal $\tilde{U} \in \mathbb{C}^{(M_x N_x + M_x + N_x - 1) \times (M_y N_y + M_y + N_y - 1)}$ of the virtual uniform planar array $\mathcal{W}$ is obtained by selecting elements in U that corresponds to the virtual sensor positions in $\mathcal{W}$. $\tilde{U}$ is modeled as:

$$\tilde{U} = \sum_{k=1}^{K} \sigma_k^2 b_x(\theta_k, \varphi_k) \circ b_y(\theta_k, \varphi_k),$$

where $b_x(\theta_k, \varphi_k) = [e^{-j\pi(-N_x+1)sin(\varphi_k)cos(\theta_k)}, e^{-j\pi(-N_x+2)sin(\varphi_k)cos(\theta_k)}, \ldots, e^{-j\pi(M_x N_x + M_x - 1)sin(\varphi_k)cos(\theta_k)}]$ and $b_y(\theta_k, \varphi_k) = [e^{-j\pi(-N_y+1)sin(\varphi_k)sin(\theta_k)}, e^{-j\pi(-N_y+2)sin(\varphi_k)sin(\theta_k)}, \ldots, e^{-j\pi(M_y N_y + M_y - 1)sin(\varphi_k)sin(\theta_k)}]$ are the steering vectors of the virtual uniform planar array $\mathcal{W}$ along the x axis and the y axis;

(4) taking the symmetric part of the virtual uniform planar array $\mathcal{W}$, i.e., $\tilde{\mathcal{W}}$ into account, which is defined as:

$$\tilde{\mathcal{W}} = \{(\check{x},\check{y})|\check{x}=\check{p}_x d, \check{y}=\check{p}_y d, -M_x N_x - M_x + 1 \leq \check{p}_x \leq N_x - 1,$$
$$-M_y N_y - M_y + 1 \leq \check{p}_y \leq N_y - 1\}.$$

transforming elements in the equivalent signal $\tilde{U}$ of the virtual uniform planar array $\mathcal{W}$, to obtain an equivalent signal $\tilde{U}_{sym} \in \mathbb{C}^{(M_x N_x + M_x + N_x - 1) \times (M_y N_y + M_y + N_y - 1)}$ of the symmetric uniform planar array $\tilde{\mathcal{W}}$, which is defined as:

$$\tilde{U}_{sym} = \sum_{k=1}^{K} \sigma_k^2 (b_x(\theta_k, \varphi_k) e^{(-M_x N_x - M_x + N_x)sin(\varphi_k)cos(\theta_k)}) \circ$$
$$(b_y(\theta_k, \varphi_k) e^{(-M_y N_y - M_y + N_y)sin(\varphi_k)sin(\theta_k)}),$$

where $e^{(-M_x N_x - M_x + N_x)sin(\varphi_k)cos(\theta_k)}$ and $e^{(-M_y N_y - M_y + N_y)sin(\varphi_k)sin(\theta_k)}$) are the symmetric factors in the x-axis and y-axis respectively concatenating the equivalent signals $\tilde{U}$ of the virtual uniform planar array $\mathcal{W}$ and the equivalent signals $\tilde{U}_{sym}$ of the symmetric virtual uniform planar array $\tilde{\mathcal{W}}$ along the third dimension, to obtain a three-dimensional coarray tensor $\mathcal{U} \in \mathbb{C}^{(M_x N_x + M_x + N_x - 1) \times (M_y N_y + M_y + N_y - 1) \times 2}$, which is defined as:

$$\mathcal{U} = \sum_{k=1}^{K} \sigma_k^2 b_x(\theta_k, \varphi_k) \circ b_y(\theta_k, \varphi_k) \circ h_k(\theta_k, \varphi_k),$$

where $h_k(\theta_k, \varphi_k) = [1, e^{(-M_x N_x - M_x + N_x)sin(\varphi_k)cos(\theta_k) + (-M_y N_y - M_y + N_y)sin(\varphi_k)sin(\theta_k)}]^T$ denotes the symmetric factor vector;

(5) segmenting a subarray with a size of $P_x \times P_y$ from the virtual uniform planar array $\mathcal{W}$, and dividing the virtual uniform planar array $\mathcal{W}$ into $L_x \times L_y$ partially overlapped uniform subarrays; denoting the subarray by $\mathcal{W}_{(s_x, s_y)}$, $s_x$=1, 2, ..., $L_x$, $s_y$=1, 2, ..., $L_y$, and expressing the position of the virtual sensor in $\mathcal{W}_{(s_x, s_y)}$ as:

$$\mathcal{W}_{(s_x, s_y)} = \{(x,y)|x=p_x d, y=p_y d, -N_x + s_x \leq p_x \leq -N_x + s_x + P_x - 1, -N_y + s_y \leq p_y \leq -N_y + s_y + P_y - 1\}.$$

obtaining a sub-coarray tensor $\mathcal{U}_{(s_x, s_y)} \in \mathbb{C}^{P_x \times P_y \times 2}$ corresponding to $\mathcal{W}_{(s_x, s_y)}$ by selecting elements in the coarray tensor $\mathcal{U}$ according to the positions of virtual sensors in the sub array $\mathcal{W}_{(s_x, s_y)}$:

$$\mathcal{U}_{(s_x, s_y)} = \sum_{k=1}^{K} \sigma_k^2 (c_x(\theta_k, \varphi_k) e^{(s_x - 1)sin(\varphi_k)cos(\theta_k)}) \circ (c_y(\theta_k, \varphi_k) e^{(s_y - 1)sin(\varphi_k)sin(\theta_k)}) \circ h_k(\theta_k, \varphi_k),$$

where $c_x(\theta_k, \varphi_k) = [e^{-j\pi(-N_x+1)sin(\varphi_k)cos(\theta_k)}, e^{-j\pi(-N_x+2)sin(\varphi_k)cos(\theta_k)}, \ldots, e^{-j\pi(-N_x+P_x)sin(\varphi_k)cos(\theta_k)}]$ and $c_y(\theta_k, \varphi_k) = [e^{-j\pi(-N_y+1)sin(\varphi_k)sin(\theta_k)}, e^{-j\pi(-N_y+2)sin(\varphi_k)sin(\theta_k)}, \ldots, e^{-j\pi(-N_y+P_y)sin(\varphi_k)sin(\theta_k)}]$ are the steering vectors of the virtual subarray $\mathcal{W}_{(1,1)}$ along the x axis and the y axis; after the above operations, a total of $L_x \times L_y$ three-dimensional sub-coarray tensors $\mathcal{U}_{(s_x, s_y)}$ whose dimensions are all $P_x \times P_y \times 2$ are obtained; the sub-coarray tensors $\mathcal{U}_{(s_x, s_y)}$ with the same index subscript $s_y$ are concatenated along the fourth dimension, to obtain $L_y$ four-dimensional tensors of size $P_x \times P_y \times 2 \times L_x$; and the $L_y$ four-dimensional tensors are further concatenated along the fifth dimension, to obtain a five-dimensional tensor $\mathcal{T} \in \mathbb{C}^{P_x \times P_y \times 2 \times L_x \times L_y}$, which is defined as:

$$\mathcal{T} = \sum_{k=1}^{K} \sigma_k^2 c_x(\theta_k, \varphi_k) \circ c_y(\theta_k, \varphi_k) \circ h_k(\theta_k, \varphi_k) \circ d_x(\theta_k, \varphi_k)$$
$$\circ d_y(\theta_k, \varphi_k),$$

where $d_x(\theta_k, \varphi_k) = [1, e^{-j\pi sin(\varphi_k)cos(\theta_k)}, \ldots, e^{-j\pi(L_x-1)sin(\varphi_k)cos(\theta_k)}]$, $d_y(\theta_k, \varphi_k) = [1, e^{-j\pi sin(\varphi_k)sin(\theta_k)}, \ldots, e^{-j\pi(L_y-1)sin(\varphi_k)sin(\theta_k)}]$ are the shifting factor vectors along the x-axis and the y-axis, respectively;

(6) defining dimensional sets $\mathbb{K}_1 = \{1, 2\}$, $\mathbb{K}_2 = \{3\}$, $\mathbb{K}_3 = \{4, 5\}$, by reshaping $\mathcal{T}$ with $\{\mathbb{K}_1, \mathbb{K}_2, \mathbb{K}_3\}$, i.e., combining the first and second dimensions of the five-dimensional tensor $\mathcal{T}$, combining the fourth and fifth dimensions, and retaining the third dimension, a three-dimensional structured coarray tensor $\mathcal{K} \in \mathbb{C}^{P_x P_y \times 2 \times L_x L_y}$ is obtained as:

$$\mathcal{K} \triangleq \mathcal{T}_{\{\mathbb{K}_1, \mathbb{K}_2, \mathbb{K}_3\}} = \Sigma_{k=1}^{K} \sigma_k^2 g(\theta_k, \varphi_k) \circ h(\theta_k, \varphi_k) \circ f(\theta_k, \varphi_k),$$

where $g(\theta_k, \varphi_k) = c_y(\theta_k, \varphi_k) \otimes c_x(\theta_k, \varphi_k)$, $f(\theta_k, \varphi_k) = d_y(\theta_k, \varphi_k) \otimes d_x(\theta_k, \varphi_k)$; and (7) performing CANDECOMP/PARACFAC decomposition on the three-dimensional structured coarray tensor $\mathcal{K}$, to obtain a closed-form solution of two-dimensional direction-of-arrivals in the underdetermined case.

Further, the structure of the coprime planar array in step (1) is specifically described as follows: a pair of sparse uniform planar subarrays $\mathbb{V}_1$ and $\mathbb{V}_2$ are constructed on a coordinate system xoy, where $\mathbb{V}_1$ includes $2M_x \times 2M_y$ sensors, the spacing between sensors in the x-axis direction and the spacing in the y-axis direction are $N_x d$ and $N_y d$ respectively, and the sensor coordinates on the xoy plane are $\{(N_x dm_x, N_y dm_y), m_x=0, 1, \ldots, 2M_x-1, m_y=0, 1, \ldots, 2M_y-1\}$; $\mathbb{V}_2$ includes $N_x \times N_y$ sensors, the spacing between sensors in the x-axis direction and array element spacing in the y-axis direction are $M_x d$ and $M_y d$ respectively, and the sensor coordinates on the xoy plane are $\{(M_x dn_x, M_y dn_y), n_x=0, 1, \ldots, N_x-1, n_y=0, 1, \ldots, N_y-1\}$; herein, $M_x, N_x$ and $M_y, N_y$ are a pair of coprime integers respectively, and $M_x \leq N_x, M_y \leq N_y$; since the subarray $\mathbb{V}_1$ and $\mathbb{V}_2$ only overlap at the origin of the coordinate system (0,0), the coprime planar array includes $4M_x M_y + N_x N_y - 1$ physical sensors.

Further, the cross-correlation tensor $\hat{\mathcal{R}}$ in step (3) is ideally modeled (noiseless scene) as:

$$\mathcal{R} = \Sigma_{k=1}^{K} \sigma_k^2 a_{Mx}(\theta_k, \varphi_k) \circ a_{My}(\theta_k, \varphi_k) \circ a^*_{Nx}(\theta_k, \varphi_k) \circ a^*_{Ny}(\theta_k, \varphi_k)$$

$a_{Mx}(\theta_k, \varphi_k) \circ a^*_{Nx}(\theta_k, \varphi_k)$ in the cross-correlation tensor $\hat{\mathcal{R}}$ can derive an augmented coarray along the x axis, and $a_{My}(\theta_k, \varphi_k) \circ a^*_{Ny}(\theta_k, \varphi_k)$ can derive an augmented coarray along the y axis, so as to obtain the augmented discontinuous virtual planar array $\mathcal{S}$.

Further, the equivalent signals of the symmetric $\tilde{\mathcal{W}}$ in step (4) is obtained by the transformation of the equivalent signals $\tilde{U}$ of the virtual uniform planar array $\mathcal{W}$, which specifically includes: performing a conjugate operation on $\tilde{U}$ to obtain $\tilde{U}^*$, and flipping elements in $\tilde{U}^*$ left and right and then up and down, to obtain the equivalent signals $\tilde{U}_{sym}$ of the symmetric uniform planar array $\tilde{\mathcal{W}}$.

Further, the concatenation of the equivalent signals $\tilde{U}$ of $\mathcal{W}$ and the equivalent signals $\tilde{U}_{sym}$ of $\tilde{\mathcal{W}}$ along the third dimension, to obtain a three-dimensional coarray tensor $\mathcal{U}$ in step (4) includes: performing CANDECOMP/PARACFAC decomposition on $\mathcal{U}$ to achieve two-dimensional direction-of-arrival estimation in the underdetermined case.

Further, in step (7), CANDECOMP/PARAFAC decomposition is performed in the three-dimensional structured coarray tensor $\mathcal{K}$, to obtain three factor matrixes, $G=[g(\hat{\theta}_1, \hat{\varphi}_1), g(\hat{\theta}_2, \hat{\varphi}_2), \ldots, g(\hat{\theta}_K, \hat{\varphi}_K)]$, $H=[h(\hat{\theta}_1, \hat{\varphi}_1), h(\hat{\theta}_2, \hat{\varphi}_2), \ldots, h(\hat{\theta}_K, \hat{\varphi}_K)]$, $F=[f(\hat{\theta}_1, \hat{\varphi}_1), f(\hat{\theta}_2, \hat{\varphi}_2), \ldots, f(\hat{\theta}_K, \hat{\varphi}_K)]$; where $(\hat{\theta}_k, \hat{\varphi}_k)$, $k=1, 2, \ldots, K$ is the estimations of $(\theta_k, \varphi_k)$, $k=1, 2, \ldots, K$; elements in the second row in the factor matrix G are divided by elements in the first row to obtain $e^{-j\pi \sin(\hat{\varphi}_k)\cos(\hat{\theta}_k)}$, and elements in the $P_x+1^{th}$ row in the factor matrix G are divided by elements in the first row to obtain $e^{-j\pi \sin(\hat{\varphi}_k)\sin(\hat{\theta}_k)}$; after a similar parameter retrieval operation from the factor matrix F, averaging and logarithm processing are performed on parameters extracted from G and F respectively, to obtain $\hat{u}_k = \sin(\hat{\varphi}_k)\cos(\hat{\theta}_k)$ and $\hat{v}_k = \sin(\hat{\varphi}_k)\sin(\hat{\theta}_k)$, and then the closed-form solution of the two-dimensional azimuth and elevation angles $(\hat{\theta}_k, \hat{\varphi}_k)$ is:

$$\hat{\theta}_k = \arctan\left(\frac{\hat{v}_k}{\hat{u}_k}\right).$$

$$\hat{\varphi}_k = \sqrt{\hat{v}_k^2 + \hat{u}_k^2}.$$

in the above step, CANDECOMP/PARAFAC decomposition follows the following unique condition:

$$k_{rank}(G) + k_{rank}(H) + k_{rank}(F) \geq 2K+2,$$

where $k_{rank}(\bullet)$ denotes a Kruskal's rank of a matrix, and $k_{rank}(G) = \min(P_x P_y, K)$, $k_{rank}(H) = \min(L_x L_y, K)$, $k_{rank}(F) = \min(2, K)$, $\min(\bullet)$ denotes a minimization operation;

optimal $P_x$ and $P_y$ values are obtained according to the above inequality, so as to obtain a theoretical maximum value of K, i.e., a theoretical upper bound of distinguishable sources, is obtained by ensuring that the uniqueness condition is satisfied; herein, the value of K exceeds the total number of physical sensors in the coprime planar array $4M_x M_y + N_x N_y - 1$.

Compared with the prior art, the present disclosure has the following advantages:

(1) In the present disclosure, the received signals of a coprime planar array are represented by a tensor, which is different from the technical means of representing two-dimensional space information by vectorization and averaging snapshot information to obtain the correlation statistics in the traditional matrix method. In the present disclosure, snapshot information is superimposed in a third dimension, and a cross-correlation tensor including four-dimensional space information is obtained through cross-correlation statistical analysis of tensor signals, which saves space structure information of original multidimensional signals.

(2) In the present disclosure, coarray statistics are derived from a four-dimensional cross-correlation tensor, and dimensions in the cross-correlation tensor that represent coarray information in the same direction are combined, so as to derive the equivalent signals of the augmented virtual arrays, which overcomes that the coarray equivalent signal derived by the traditional matrix method has problems such as loss of structural information and a large linear scale.

(3) In the present disclosure, a three-dimensional tensor signal is further constructed in a coarray on the basis of constructing the equivalent signals of the virtual array, so as to establish an association between a two-dimensional coarray and the tensorial space, which provides a theoretical pre-condition for obtaining a closed-form solution of two-dimensional direction-of-arrival estimation by tensor decomposition and also lays a foundation for the construction of a structured coarray tensor and the increase of degrees-of-freedom.

(4) In the present disclosure, the number of degrees-of-freedom of the coarray tensor processing method is effectively improved by dimension extension of the coarray tensor signal and the construction of the structured coarray tensor, thereby achieving two-dimensional direction-of-arrival estimation in the underdetermined case.

DESCRIPTION OF EMBODIMENTS

The technical solution of the present disclosure will be described in further detail below with reference to the accompanying drawings.

Figure 1:
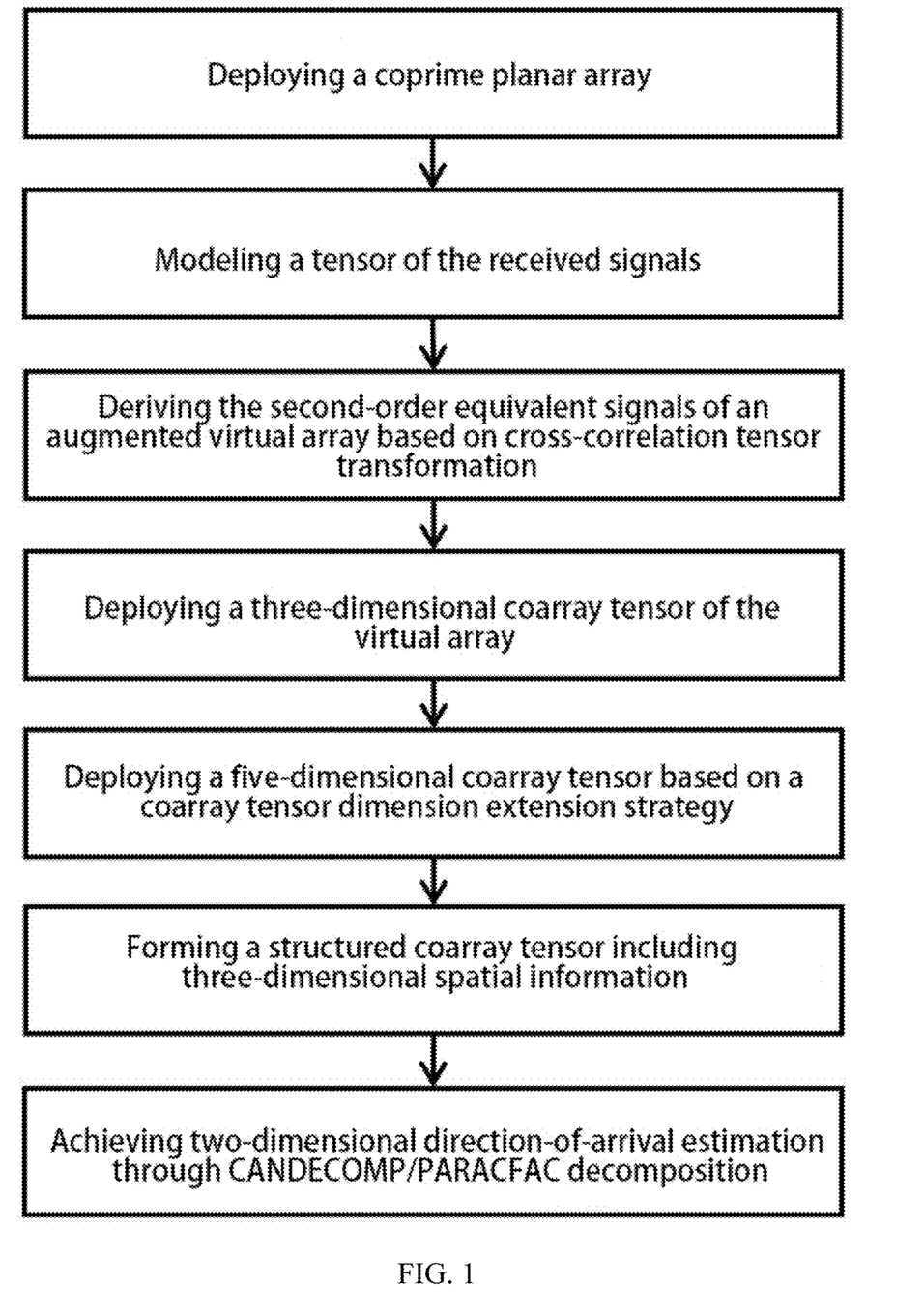
FIG. 1 is an overall flow diagram according to the present disclosure.
Figure 2:
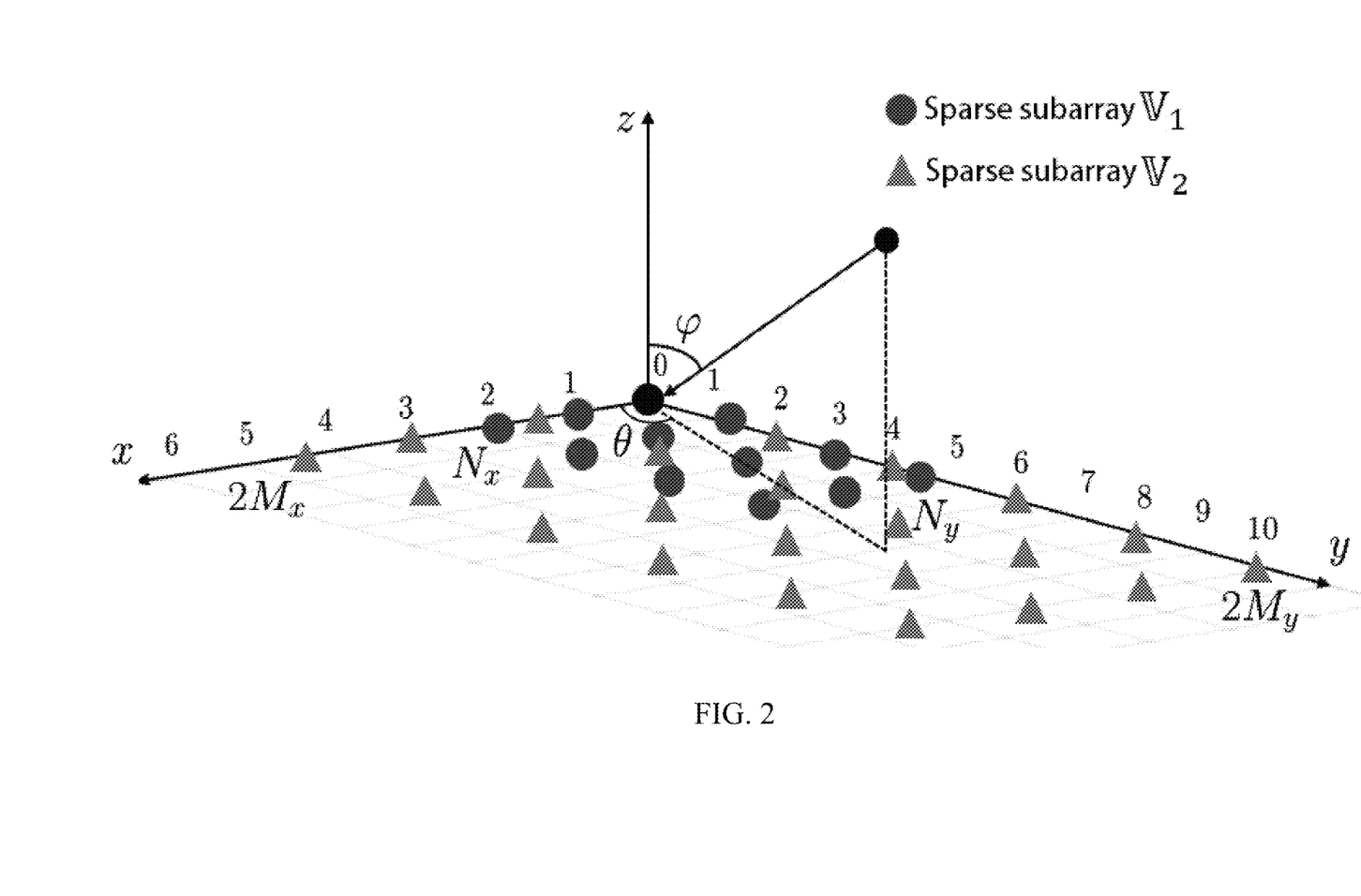
FIG. 2 is a schematic structural diagram of a coprime planar array according to the present disclosure.

In order to solve the problem of loss of degrees-of-freedom in the existing methods, the present disclosure provides a two-dimensional direction-of-arrival estimation method for a coprime planar array based on structured coarray tensor processing, which establishes an association between a coprime planar array coarray domain and second-order tensor statistics in combination with means such as multi-linear analysis, coarray tensor signal construction, and coarray tensor decomposition, so as to achieve two-dimensional direction-of-arrival estimation in an underdetermined condition. Referring to FIG. 1, the present disclosure is implemented through the following steps:

Step 1: A coprime planar array is deployed. The coprime planar array is deployed with $4M_xM_y+N_xN_y-1$ physical sensors at a receiving end. As shown in FIG. 2, a pair of sparse uniform planar subarrays $\mathbb{V}_1$ and $\mathbb{V}_2$ are constructed on a coordinate system xoy plane, wherein $\mathbb{V}_1$ includes $2M_x \times 2M_y$ sensors, spacing in the x-axis direction and spacing in the y-axis direction are $N_x d$ and $N_y d$ respectively, and position coordinates thereof on the xoy are $\{(N_x dm_x, N_y dm_y), m_x=0, 1, \ldots, 2M_x-1, m_y=0, 1, \ldots, 2M_y-1\}$; $\mathbb{V}_2$ includes $N_x \times N_y$ sensors, spacing in the x-axis direction and spacing in the y-axis direction are $M_x d$ and $M_y d$ respectively, and position coordinates thereof on the xoy are $\{(M_x dn_x, M_y dn_y), n_x=0, 1, \ldots, N_x-1, n_y=0, 1, \ldots, N_y-1\}$, $M_x$, $N_x$ and $M_y$, $N_y$ are a pair of coprime integers respectively, and $M_x < N_x$, $M_y < N_y$. A spacing d is set to half of an incident narrowband signal wavelength $\lambda$, i.e., $d=\lambda/2$. Subarray combination is performed on $\mathbb{V}_1$ and $\mathbb{V}_2$ according to overlap of sensors at a position of a coordinate system (0,0), to obtain a coprime planar array actually including $4M_xM_y+N_xN_y-1$ physical sensors.

Step 2: The tensor signals of the coprime planar array is modeled. Assuming that there are K far-field narrowband incoherent sources from $\{(\theta_1, \varphi_1), (\theta_2, \varphi_2), \ldots, (\theta_K, \varphi_K)\}$ directions, a three-dimensional tensor $\mathcal{X}_1 \in \mathbb{C}^{2M_x \times 2M_y \times L}$ (L denotes the number of sampling snapshots) may be obtained after sampling snapshots on the sparse uniform subarray $\mathbb{V}_1$ of the coprime planar array are superimposed in the third dimension, which is modeled as:

$$\mathcal{X}_1 = \sum_{k=1}^{K} a_{Mx}(\theta_k, \varphi_k) \circ a_{My}(\theta_k, \varphi) \circ s_k + \mathcal{N}_1,$$

wherein $s_k=[s_{k,1}, s_{k,2}, \ldots, s_{k,L}]^T$ denotes a multi-snapshot signal waveform corresponding to the $k^{th}$ source, $[\bullet]^T$ denotes a transpose operation, $\circ$ denotes an exterior product of vectors, $\mathcal{N}_1$ denotes an additive Gaussian white noise tensor, and $a_{Mx}(\theta_k, \varphi_k)$ and $a_{My}(\theta_k, \varphi_k)$ denote steering vectors of $\mathbb{V}_1$ in x-axis and y-axis directions respectively, corresponding to the source from direction $(\theta_k, \varphi_k)$, and are defined as:

$$a_{Mx}(\theta_k, \varphi_k) = \left[1, e^{-j\pi u_1^{(2)} \sin(\varphi_k)\cos(\theta_k)}, \ldots, e^{-j\pi u_1^{(2M_x)} \sin(\varphi_k)\cos(\theta_k)}\right]^T,$$

$$a_{My}(\theta_k, \varphi_k) = \left[1, e^{-j\pi v_1^{(2)} \sin(\varphi_k)\sin(\theta_k)}, \ldots, e^{-j\pi v_1^{(2M_y)} \sin(\varphi_k)\sin(\theta_k)}\right]^T,$$

wherein $u_1^{(i_1)}(i_1=1, 2, \ldots, 2M_x)$ and $v_1^{(i_2)}(i_2=1, 2, \ldots, 2M_y)$ denote actual positions of $i_1{}^{th}$ and $i_2{}^{th}$ physical sensors in the sparse subarray $\mathbb{V}_1$ in the x-axis and y-axis directions, and $u_1^{(1)}=0$, $v_1^{(1)}=0$, $j=\sqrt{-1}$.

Similarly, a received signals of the sparse uniform subarray $\mathbb{V}_2$ may be defined by another three-dimensional tensor $\mathcal{X}_2 \in \mathbb{C}^{N_x \times N_y \times L}$:

$$\mathcal{X}_2 = \sum_{k=1}^{K} a_{Nx}(\theta_k, \varphi_k) \circ a_{Ny}(\theta_k, \varphi_k) \circ s_k + \mathcal{N}_2,$$

wherein $\mathcal{N}_2$ denotes a noise tensor, and $a_{Nx}(\theta_k, \varphi_k)$ and $a_{Ny}(\theta_k, \varphi_k)$ denote the steering vectors of $\mathbb{V}_2$ in the x-axis and y-axis directions respectively, corresponding to a signal source from direction $(\theta_k, \varphi_k)$, and are defined as:

$$a_{Nx}(\theta_k, \varphi_k) = \left[1, e^{-j\pi u_2^{(2)} \sin(\varphi_k)\cos(\theta_k)}, \ldots, e^{-j\pi u_2^{(N_x)} \sin(\varphi_k)\cos(\theta_k)}\right]^T,$$

$$a_{Ny}(\theta_k, \varphi_k) = \left[1, e^{-j\pi v_2^{(2)} \sin(\varphi_k)\sin(\theta_k)}, \ldots, e^{-j\pi v_2^{(N_y)} \sin(\varphi_k)\sin(\theta_k)}\right]^T,$$

wherein $u_2^{(i_3)}(i_3=1, 2, \ldots, N_x)$ and $v_2^{(i_4)}(i_4=1, 2, \ldots, N_y)$ denote actual positions of $i_3{}^{th}$ and $i_4{}^{th}$ physical sensors in the sparse subarray $\mathbb{V}_2$ in the x-axis and y-axis directions, and $u_2^{(1)}=0$, $v_2^{(1)}=0$.

Cross-correlation statistics of three-dimensional tensors $\mathcal{X}_1$ and $\mathcal{X}_2$ sampled by the sparse subarrays $\mathbb{V}_1$ and $\mathbb{V}_2$ is calculated, to obtain the second-order cross-correlation tensor $\hat{\mathcal{R}} \in \mathbb{C}^{2M_x \times 2M_y \times N_x \times N_y}$ including four-dimensional spatial information:

$$\hat{\mathcal{R}} = \frac{1}{L}\sum_{l=1}^{L} \mathcal{X}_1(l) \circ \mathcal{X}_2^*(l),$$

wherein $\mathcal{X}_1(l)$ and $\mathcal{X}_2(l)$ denote the $l^{th}$ slice of $\mathcal{X}_1$ and $\mathcal{X}_2$ in the third dimension (i.e., temporal dimension) respectively, and $(\bullet)^*$ denotes a conjugate operation.

Figure 3:
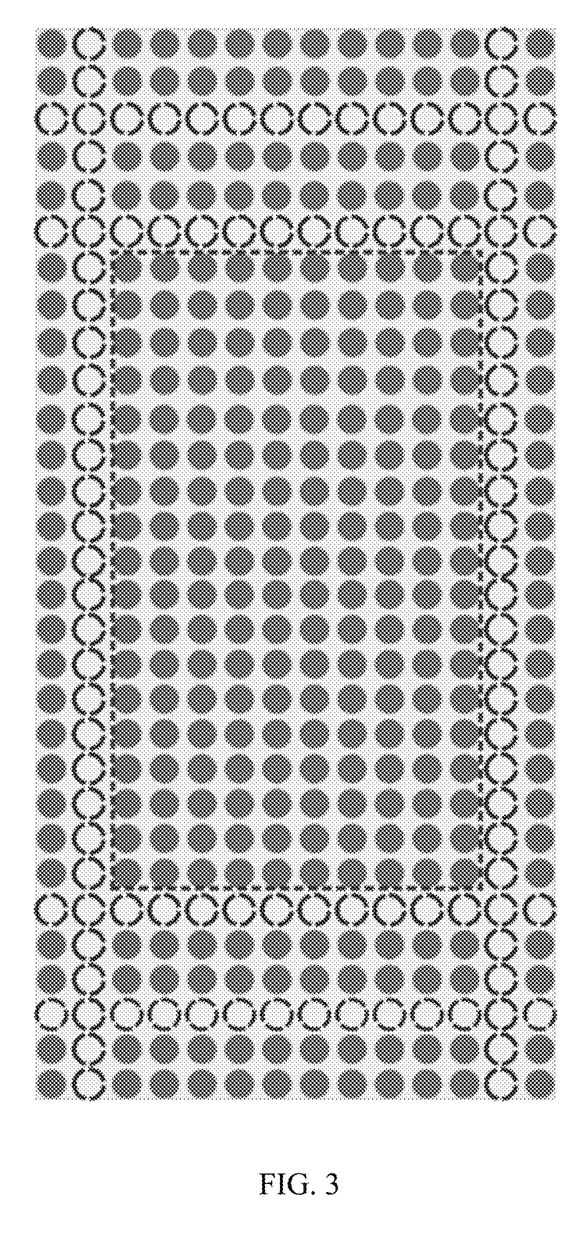
FIG. 3 is a schematic structural diagram of an augmented virtual planar array derived according to the present disclosure.

Step 3: A second-order equivalent signals of the virtual array associated with coprime planar array based on cross-correlation tensor statistics is derived. The cross-correlation tensor $\hat{\mathcal{R}}$ of the received tensor signals of the two subarrays may be ideally modeled (noiseless scene) as:

$$\hat{\mathcal{R}} = \sum_{k=1}^{K} \sigma_k^2 a_{Mx}(\theta_k, \varphi_k) \circ a_{My}(\theta_k, \varphi_k) \circ a^*_{Nx}(\theta_k, \varphi_k) \circ a^*_{Ny}(\theta_k, \varphi_k),$$

wherein $\sigma_k^2$ denotes power of the $k^{th}$ source. In this case, $a_{Mx}(\theta_k, \varphi_k) \cdot a^*_{Nx}(\theta_k, \varphi_k)$ in the cross-correlation tensor $\hat{\mathcal{R}}$ is equivalent to an augmented coarray along the x axis, and $a_{My}(\theta_k, \varphi_k) \circ a^*_{Ny}(\theta_k, \varphi_k)$ is equivalent to an augmented coarray along the y axis, so as to obtain the augmented discontinuous virtual planar array $\mathcal{S}$. As shown in FIG. 3, a position of each virtual sensor is defined as:

$$\mathcal{S} = \{(-M_x n_x d + N_x m_x d, -M_y n_y d + N_y m_y d) | 0 \le n_x \le N_x - 1,\\ 0 \le m_x \le 2M_x - 1, 0 \le n_y \le N_y - 1, 0 \le m_y \le 2M_y - 1\}.$$

$\mathcal{S}$ contains a virtual uniform planar array $\mathcal{W}$ including $(M_x N_x + M_x + N_x - 1) \times (M_y N_y + M_y + N_y - 1)$ virtual sensors with x-axis distribution from $(-N_x+1)d$ to $(M_x N_x + M_x - 1)d$ and y-axis distribution from $(-N_y+1)d$ to $(M_y N_y + M_y - 1)d$, as shown in the dashed box of FIG. 3, which is specifically defined as:

$$\mathcal{W} = \{(x,y) | x = p_x d, y = p_y d, -N_x + 1 \le p_x \le M_x N_x + M_x - 1,\\ -N_y + 1 \le p_y \le M_y N_y + M_y - 1\}.$$

In order to obtain the equivalent signals of the augmented virtual planar array $\mathcal{S}$, there is a need to combine the first and third dimensions in the cross-correlation tensor $\hat{\mathcal{R}}$ that represent the spatial information in the x-axis direction into one dimension and combine second and fourth dimensions that represent spatial information in the y-axis direction into another dimension. Dimension combination of tensors can be achieved by the tensor reshaping operation. Taking a four-dimensional tensor $\mathcal{B} \in \mathbb{C}^{I_1 \times I_2 \times I_3 \times I_4} = \sum_{r=1}^{R} b_{11} \cdot b_{12} \circ b_{21} \circ b_{22}$ as an example, dimension sets $\mathbb{T}_1 = \{1, 2\}$ and $\mathbb{T}_2 = \{3, 4\}$ are defined, and then unfolding of a module $\{\mathbb{T}_1, \mathbb{T}_2\}$ of PARAFAC decomposition of $\mathcal{B}$ is as follows:

$$B \in \mathbb{C}^{I_1 I_2 \times I_3 I_4} \triangleq \mathcal{B}_{(\mathbb{T}_1, \mathbb{T}_2)} = \sum_{r=1}^{R} b_1 \circ b_2,$$

wherein the tensor subscript denotes the tensor reshaping; $b_1 = b_{12} \otimes b_{11}$ and $b_2 = b_{22} \otimes b_{21}$ denote factor vectors of two dimensions after the unfolding respectively. Herein, $\otimes$ denotes Kroneker product. Therefore, dimension sets $\mathbb{J}_1 = \{1, 3\}$ and $\mathbb{J}_2 = \{2, 4\}$ are defined, and a module $\{\mathbb{J}_1, \mathbb{J}_2\}$ of reshaping is performed for an ideal value $\mathcal{R}$ (noiseless scene) of the cross-correlation tensor $\hat{\mathcal{R}}$, to obtain an equivalent second-order signals $U \in \mathbb{C}^{2M_x N_x \times 2M_y N_y}$ of the augmented virtual planar array $\mathcal{S}$:

$$U \triangleq \mathcal{R}_{\{\mathbb{J}_1, \mathbb{J}_2\}} = \sum_{k=1}^{K} \sigma_k^2 a_x(\theta_k, \varphi_k) \circ a_y(\theta_k, \varphi_k),$$

wherein $a_x(\theta_k, \varphi_k) = a^*_{Nx}(\theta_k, \varphi_k) \otimes a_{Mx}(\theta_k, \varphi_k)$, $a_y(\theta_k, \varphi_k) = a^*_{Ny}(\theta_k, \varphi_k) \otimes a_{My}(\theta_k, \varphi_k)$ denote steering vectors of the augmented virtual planar array $\mathcal{S}$ corresponding to a $(\theta_k, \varphi_k)$ direction on the x axis and the y axis. Based on the above derivation, the equivalent signals $\tilde{U} \in \mathbb{C}^{(M_x N_x + M_x + N_x - 1) \times (M_y N_y + M_y + N_y - 1)}$ of the virtual uniform planar array $\mathcal{W}$ is obtained by selecting elements in U corresponding to virtual sensor positions in $\mathcal{W}$, which is modeled as:

$$\tilde{U} = \sum_{k=1}^{K} \sigma_k^2 b_x(\theta_k, \varphi_k) \circ b_y(\theta_k, \varphi_k),$$

wherein $b_x(\theta_k, \varphi_k) = [e^{-j\pi(-N_x+1)\sin(\varphi_k)\cos(\theta_k)},$ $e^{-j\pi(-N_x+2)\sin(\varphi_k)\cos(\theta_k)}, \ldots,$ $e^{-j\pi(M_x N_x + M_x - 1)\sin(\varphi_k)\cos(\theta_k)}]$ and $b_y(\theta_k, \varphi_k) = [e^{-j\pi(-N_y+1)\sin(\varphi_k)\sin(\theta_k)},$ $e^{-j\pi(-N_y+2)\sin(\varphi_k)\sin(\theta_k)}, \ldots, e^{-j\pi(M_y N_y + M_y - 1)\sin(\varphi_k)\sin(\theta_k)}]$ Denote steering vectors of the virtual uniform planar array $\mathcal{W}$ corresponding to the $(\theta_k, \varphi_k)$ direction on the x axis and the y axis.

Step 4: A three-dimensional tensor signal of the coprime planar array virtual domain is constructed. In order to increase an effective aperture of the virtual planar array and further improve the degree of freedom, a symmetric extension $\tilde{\mathcal{W}}$ of the virtual uniform planar array $\mathcal{W}$ is taken into account, which is defined as:

$$\tilde{\mathcal{W}} = \{(\tilde{x}, \tilde{y}) | \tilde{x} = \tilde{p}_x d, \tilde{y} = \tilde{p}_y d, -M_x N_x - M_x + 1 \le \tilde{p}_x \le N_x - 1,\\ -M_y N_y - M_y + 1 \le \tilde{p}_y \le N_y - 1\}.$$

In order to obtain the equivalent signals of the symmetric uniform planar array $\tilde{\mathcal{W}}$, the equivalent signal $\tilde{U}$ of the virtual uniform planar array $\mathcal{W}$ may be transformed specifically as follows: performing a conjugate operation on $\tilde{U}$ to obtain $\tilde{U}^*$, and flipping elements in $\tilde{U}^*$ left and right and then up and down, to obtain the equivalent signal $\tilde{U}_{sym} \in \mathbb{C}^{(M_x N_x + M_x + N_x - 1) \times (M_y N_y + M_y + N_y - 1)}$ corresponding to the symmetric uniform planar array $\tilde{\mathcal{W}}$, which is defined as:

$$\tilde{U}_{sym} = \sum_{k=1}^{K} \sigma_k^2 (b_x(\theta_k, \varphi_k) e^{(-M_x N_x - M_x + N_x)\sin(\varphi_k)\cos(\theta_k)}) \cdot\\ (b_y(\theta_k, \varphi_k) e^{(-M_y N_y - M_y + N_y)\sin(\varphi_k)\sin(\theta_k)}),$$

where $e^{(-M_x N_x - M_x N_x)\sin(\varphi_k)\cos(\theta_k)}$ and $e^{(-M_y N_y - M_y N_y)\sin(\varphi_k)\sin(\theta_k)})$ denote symmetric factors in the x-axis and y-axis directions respectively when mirror transformation is performed on the virtual uniform planar array $\mathcal{W}$.

Figure 4:
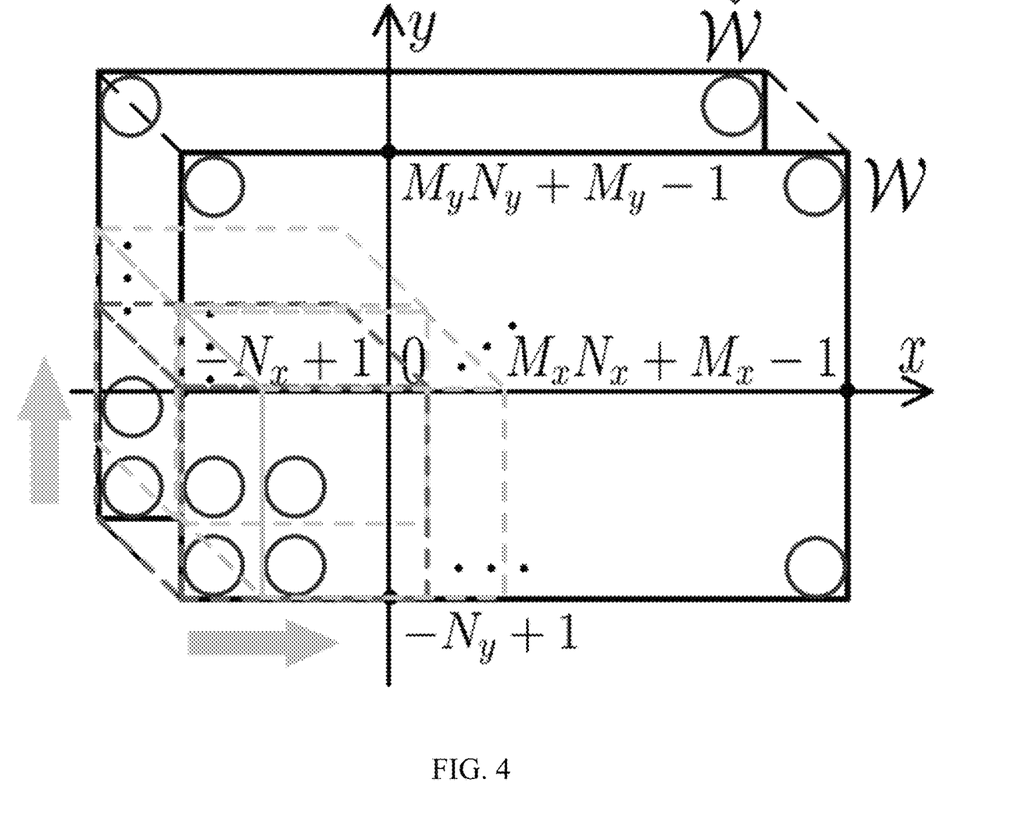
FIG. 4 is a schematic diagram of a dimension extension process of a coarray tensor signal of a coprime planar array according to the present disclosure.

The equivalent signals $\tilde{U}$ of the virtual uniform planar array $\mathcal{W}$ and the equivalent signal $\tilde{U}_{sym}$ of the symmetric uniform planar array $\tilde{\mathcal{W}}$ are superimposed in the third dimension, to obtain a three-dimensional coarray tensor $\mathcal{U} \in \mathbb{C}^{(M_x N_x + M_x + N_x - 1) \times (M_y N_y + M_y + N_y - 1) \times 2}$ for the coprime planar array, the structure thereof is as shown in FIG. 4, and the three-dimensional coarray tensor is defined as:

$$\mathcal{U} = \sum_{k=1}^{K} \sigma_k^2 b_x(\theta_k, \varphi_k) \circ b_y(\theta_k, \varphi_k) \circ h_k(\theta_k, \varphi_k),$$

wherein $h_k(\theta_k, \varphi_k) = [1, e^{(-M_x N_x - M_x + N_x)\sin(\varphi_k)\cos(\theta_k) + (-M_y N_y - M_y + N_y)\sin(\varphi_k)\sin(\theta_k)}]^T$ denotes a symmetric transformation factor vector.

Step 5: A five-dimensional coarray tensor is constructed based on a coarray tensor dimension extension strategy. As shown in FIG. 4, a subarray with a size of $P_x \times P_y$ is taken from the virtual uniform planar array $\mathcal{W}$, every other sensor along the x-axis and y-axis directions respectively, and then the virtual uniform planar array $\mathcal{W}$ may be divided into $L_x \times L_y$ uniform subarrays partially overlapping each other. $L_x$, $L_y$, $P_x$, $P_y$ satisfy the following relations:

$$P_x + L_x - 1 = M_x N_x + M_x + N_x - 1,$$

$$P_y + L_y - 1 = M_y N_y + M_y + N_y - 1.$$

The subarray is defined as $\mathcal{W}_{(s_x, s_y)}$, $s_x = 1, 2, \ldots, L_x$, $s_y = 1, 2, \ldots, L_y$, and a position of an virtual sensor in $\mathcal{W}_{(s_x, s_y)}$ is defined as:

$$\mathcal{W}_{(s_x, s_y)} = \{(x, y) | x = p_x d, y = p_y d, -N_x + s_x \le p_x \le -N_x + s_x + P_x - 1, -N_y + s_y \le p_y \le -N_y + s_y + P_y - 1\}.$$

A tensor signal $\mathcal{U}_{(s_x,s_y)} \in \mathbb{C}^{P_x \times P_y \times 2}$ in the virtual subarray $\mathcal{W}_{(s_x,s_y)}$ is obtained according to corresponding position elements in a coarray tensor signal $\mathcal{U}$ corresponding to the subarray $\mathcal{W}_{(s_x,s_y)}$:

$$\mathcal{U}_{(s_x,s_y)} = \sum_{k=1}^{K} \sigma_k^2 (c_x(\theta_k,\varphi_k) e^{(s_x-1)\sin(\varphi_k)\cos(\theta_k)}) \cdot (c_y(\theta_k,\varphi_k) e^{(s_y-1)\sin(\varphi_k)\sin(\theta_k)}) \cdot h_k(\theta_k,\varphi_k),$$

where $c_x(\theta_k, \varphi_k) = [e^{-j\pi(-N_x+1)\sin(\varphi_k)\cos(\theta_k)}, e^{-j\pi(-N_x+2)\sin(\varphi_k)\cos(\theta_k)}, \ldots, e^{-j\pi(-N_x+P_x)\sin(\varphi_k)\cos(\theta_k)}]$ and $c_y(\theta_k, \varphi_k) = [e^{-j\pi(-N_y+1)\sin(\varphi_k)\sin(\theta_k)}, e^{-j\pi(-N_y+2)\sin(\varphi_k)\sin(\theta_k)}, \ldots, e^{-j\pi(-N_y+P_y)\sin(\varphi_k)\sin(\theta_k)}]$ denote steering vectors of a virtual subarray $\mathcal{W}_{1,1}$) corresponding to the $(\theta_k, \varphi_k)$ direction on the x axis and the y axis. After the above operations, a total of $L_x \times L_y$ three-dimensional tensors $\mathcal{U}_{(s_x, s_y)}$ whose dimensions are all $P_x \times P_y \times 2$ are obtained. In order to extend the dimension of the coarray tensor, firstly, tensors in the three-dimensional sub-coarray tensors $\mathcal{U}_{(s_x, s_y)}$ with the same index subscript $s_y$ are concatenated in the fourth dimension, to obtain $L_y$ four-dimensional tensors with size of $P_x \times P_y \times 2 \times L_x$; and further, the $L_y$ four-dimensional tensors are concatenated in the fifth dimension, to obtain a five-dimensional coarray tensor $\mathcal{T} \in \mathbb{C}^{P_x \times P_y \times 2 \times L_x \times L_y}$ which is defined as:

$$\mathcal{T} = \sum_{k=1}^{K} \sigma_k^2 c_x(\theta_k,\varphi_k) \circ c_y(\theta_k,\varphi_k) \circ h_k(\theta_k,\varphi_k) \circ d_x(\theta_k,\varphi_k) \circ d_y(\theta_k,\varphi_k),$$

where $d_x(\theta_k, \varphi_k) = [1, e^{-j\pi \sin(\varphi_k)\cos(\theta_k)}, \ldots, e^{-j\pi(L_x-1)\sin(\varphi_k)\cos(\theta_k)}]$, $d_y(\theta_k, \varphi_k) = [1, e^{-j\pi \sin(\varphi_k)\sin(\theta_k)}, \ldots, e^{-j\pi(L_y-1)\sin(\varphi_k)\sin(\theta_k)}]$ denote the shifting factor vectors corresponding to the x-axis and y-axis directions respectively during coarray tensor dimension extension and construction.

Step 6: A structured coarray tensor including three-dimensional spatial information is formed. In order to obtain the structured coarray tensor, the five-dimensional coarray tensor $\mathcal{T}$ after dimension extension is combined along first and second dimensions representing angular information and is also combined along fourth and fifth dimensions representing shifting information, and the third dimension representing symmetric transformation information is retained, which includes the following specific operations: defining dimension sets $\mathbb{K}_1 = \{1, 2\}$, $\mathbb{K}_2 = \{3\}$, $\mathbb{K}_3 = \{4, 5\}$, and unfolding a module $\{\mathbb{K}_1, \mathbb{K}_2, \mathbb{K}_3\}$ of reshaping of $\mathcal{T}$, to obtain a three-dimensional structured coarray tensor $\mathcal{K} \in \mathbb{C}^{P_x P_y \times 2 \times L_x L_y}$:

$$\mathcal{K} \triangleq \mathcal{T}_{\{\mathbb{K}_1, \mathbb{K}_2, \mathbb{K}_3\}} = \sum_{k=1}^{K} \sigma_k^2 g(\theta_k,\varphi_k) \circ h(\theta_k,\varphi_k) \circ f(\theta_k,\varphi_k),$$

where $g(\theta_k, \varphi_k) = c_y(\theta_k, \varphi_k) \otimes c_x(\theta_k, \varphi_k)$, $f(\theta_k, \varphi_k) = d_y(\theta_k, \varphi_k) \otimes d_x(\theta_k, \varphi_k)$. Three dimensions of the structured coarray tensor $\mathcal{K}$ represent angular information, symmetric transformation information, and shifting information respectively.

Step 7: Two-dimensional direction-of-arrival estimation is obtained through CANDECOMP/PARACFAC decomposition of the structured coarray tensor. CANDECOMP/PARACFAC decomposition is performed on the three-dimensional structured coarray tensor $\mathcal{K}$, to obtain three factor matrixes, $G = [g(\hat{\theta}_1, \hat{\varphi}_1), g(\hat{\theta}_2, \hat{\varphi}_2), \ldots, g(\hat{\theta}_K, \hat{\varphi}_K)]$, $H = [h(\hat{\theta}_1, \hat{\varphi}_1), h(\hat{\theta}_2, \hat{\varphi}_2), \ldots, h(\hat{\theta}_K, \hat{\varphi}_K)]$, $F = [f(\hat{\theta}_1, \hat{\varphi}_1), f(\hat{\theta}_2, \hat{\varphi}_2), \ldots, f(\hat{\theta}_K, \hat{\varphi}_K)]$; where $(\hat{\theta}_k, \hat{\varphi}_k)$, $k=1, 2, \ldots, K$ is the estimated value of each incident angle $(\theta_k, \varphi_k)$, $k=1, 2, \ldots, K$; elements in the second row in the factor matrix G are divided by elements in the first row to obtain $e^{-j\pi \sin(\hat{\varphi}_k)\cos(\hat{\theta}_k)}$, and elements in the $P_x+1^{th}$ row in the factor matrix G are divided by elements in the first row to obtain $e^{-j\pi \sin(\hat{\varphi}_k)\sin(\hat{\theta}_k)}$; after a similar parameter retrieval operation is also performed on the factor matrix F, averaging and logarithm processing are performed on parameters extracted from G and F respectively, to obtain $\hat{u}_k = \sin(\hat{\varphi}_k)\cos(\hat{\theta}_k)$ and $\hat{v}_k = \sin(\hat{\varphi}_k)\sin(\hat{\theta}_k)$, and then the closed-form solution of the two-dimensional direction-of-arrival estimation $(\hat{\theta}_k, \hat{\varphi}_k)$ is:

$$\hat{\theta}_k = \arctan\left(\frac{\hat{v}_k}{\hat{u}_k}\right),$$

$$\hat{\varphi}_k = \sqrt{\hat{v}_k^2 + \hat{u}_k^2}.$$

In the above step, CANDECOMP/PARAFAC decomposition follows the following uniqueness condition:

$$k_{rank}(G) + k_{rank}(H) + k_{rank}(F) \geq 2K+2,$$

wherein $k_{rank}(\bullet)$ denotes a Kruskal's rank of a matrix, and $k_{rank}(G) = \min(P_x P_y, K)$, $k_{rank}(H) = \min(L_x L_y, K)$, $k_{rank}(F) = \min(2, K)$, $\min(\bullet)$ denotes a minimization operation.

Optimal $P_x$ and $P_y$ values are obtained according to the above inequality, so as to obtain a theoretical maximum value of K, i.e., a theoretical upper bound of the distinguishable sources, is obtained by ensuring that the uniqueness condition is satisfied. Herein, the value of K exceeds the total number $4M_x M_y + N_x N_y - 1$ of actual physical sensors of the coprime planar array due to construction and processing of the structured coarray tensor, which indicates that the degrees-of-freedom of direction-of-arrival estimation is improved.

The effect of the present disclosure is further described below with reference to a simulation example.

Simulation example: a coprime planar array is used to receive incident signals, parameters thereof are selected as $M_x=2$, $M_y=3$, $N_x=3$, $N_y=4$, that is, the coprime planar array includes a total of $4M_x M_y + N_x N_y - 1 = 35$ physical sensors. Assuming that the number of incident narrowband sources is 50 and azimuth angles in an incident direction are evenly distributed over $[-65°, 5°] \cup [5°, 65°]$, elevation angles are evenly distributed within a space angle domain range of $[5°, 65°]$. 500 noiseless sampling snapshots are used for a simulation experiment.

Figure 5:
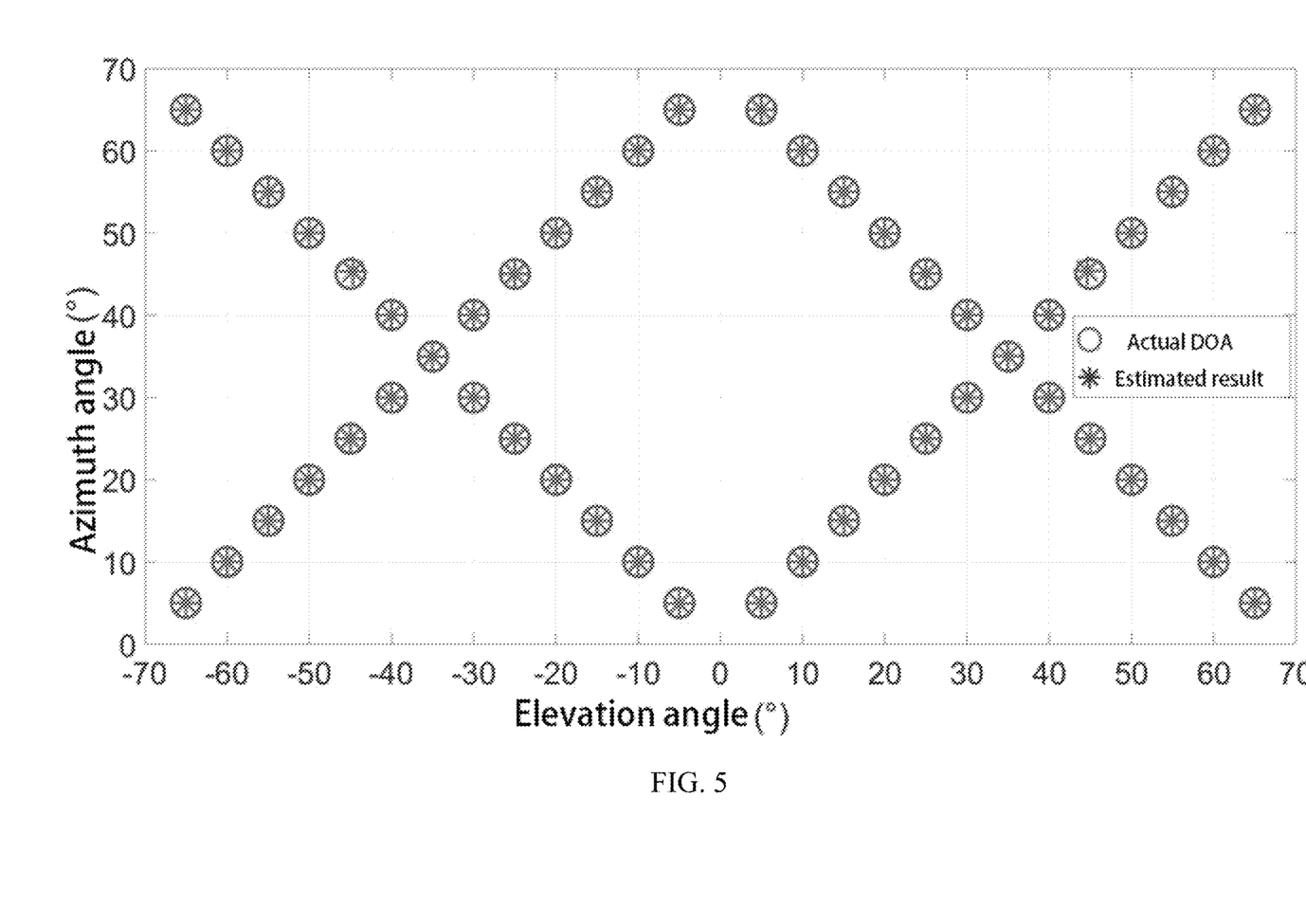
FIG. 5 is an effect diagram of multi-source direction-of-arrival estimation in a method according to the present disclosure.

Estimation results of the two-dimensional direction-of-arrival estimation method for a coprime planar array based on structured coarray tensor processing provided in the present disclosure are as shown in FIG. 5, among which x and y axes represent elevation and azimuth angles of incident signal sources respectively. It can be seen that the method provided in the present disclosure can effectively distinguish the 50 incident sources. For the traditional direction-of-arrival estimation method using a uniform planar array, 35 physical sensors can be used to distinguish only at most 34 incident signals. The above results indicate that the method provided in the present disclosure achieves the increase of the degree of freedom.

Based on the above, the present disclosure fully considers an association between a two-dimensional coarray of a coprime planar array and the tensorial space, derives the coarray equivalent signals through second-order statistic analysis of the tensor signal, and retains structural information of the multi-dimensional received signal and the coarray. Moreover, coarray tensor dimension extension and structured coarray tensor construction mechanisms are established, which lays a theoretical foundation for maximizing the number of degrees-of-freedom. Finally, the present disclosure performs multidimensional feature extraction on the structured coarray tensor to form a closed-form solution of two-dimensional direction-of-arrival estimation, and achieves a breakthrough in the degree of freedom performance.

The above are only preferred implementations of the present disclosure. Although the present disclosure has been disclosed above with preferred embodiments, the preferred embodiments are not intended to limit the present disclosure. Any person skilled in the art can make, without departing from the scope of the technical solution of the present disclosure, many possible variations and modifications to the technical solution of the present disclosure or modify the technical solution as equivalent embodiments of equivalent changes by using the method and technical contents disclosed above. Therefore, any simple alteration, equivalent change, or modification made to the above embodiments according to the technical essence of the present disclosure without departing from the contents of the technical solution of the present disclosure still fall within the protection scope of the technical solution of the present disclosure.

What is claimed is:

1. A two-dimensional direction-of-arrival (DOA) estimation method for a coprime planar array based on structured coarray tensor signal processing, comprising following steps of:

(1) providing a receiver, which is constituted by $4M_xM_y+N_xN_y-1$ physical sensors arranged in a coprime planar array; wherein $M_x$, $N_x$ and $M_y$, $N_y$ are pairs of coprime integers respectively, and $M_x<N_x$, $M_y<N_y$; and the receiver is decomposed into two sparse uniform subarrays, which are respectively a first sparse uniform subarray $\mathbb{V}_1$ and a second sparse uniform subarray $\mathbb{V}_2$;

(2) receiving, by the receiver, signals of K far-field narrowband incoherent sources from directions {$(\theta_1,\varphi_1), (\theta_2,\varphi_2), \ldots, (\theta_K,\varphi_K)$}, and processing the signals as the following manner:

the received signals of the first sparse uniform subarray $\mathbb{V}_1$ being expressed by using a three-dimensional tensor $\mathcal{X}_1 \in \mathbb{C}^{2M_x \times 2M_y \times L}$ (L denotes the number of sampling snapshots) as:

$$\mathcal{X}_1 = \sum_{k=1}^{K} a_{Mx}(\theta_k, \varphi_k) \circ a_{My}(\theta_k, \varphi_k) \circ s_k + \mathcal{N}_1,$$

wherein $s_k=[s_{k,1}, s_{k,2}, \ldots, s_{k,L}]^T$ denotes a waveform corresponding to the $k^{th}$ source, $[\cdot]^T$ denotes a transpose operation, $\circ$ denotes an exterior product of vectors, $\mathcal{N}_1$ denotes an additive Gaussian white noise tensor, and $a_{Mx}(\theta_k, \varphi_k)$ and $a_{My}(\theta_k, \varphi_k)$ denote steering vectors of the first sparse uniform subarray $\mathbb{V}_1$ along x-axis and y-axis, respectively, $a_{Mx}(\theta_k, \varphi_k)$ and $a_{My}(\theta_k, \varphi_k)$ and are defined as:

$$a_{Mx}(\theta_k, \varphi_k) = \left[1, e^{-j\pi u_1^{(2)}\sin(\varphi_k)\cos(\theta_k)}, \ldots, e^{-j\pi u_1^{(2M_x)}\sin(\varphi_k)\cos(\theta_k)}\right]^T,$$

$$a_{My}(\theta_k, \varphi_k) = \left[1, e^{-j\pi v_1^{(2)}\sin(\varphi_k)\sin(\theta_k)}, \ldots, e^{-j\pi v_1^{(2M_y)}\sin(\varphi_k)\sin(\theta_k)}\right]^T,$$

wherein $u_1^{(i_1)}(i_1=1, 2, \ldots, 2M_x)$ and $v_1^{(i_2)}(i_2=1, 2, \ldots, 2M_y)$ denote positions of $i_1^{th}$ and $i_2^{th}$ physical sensors in the first sparse uniform subarray $\mathbb{V}_1$ in the x-axis and y-axis with $u_1^{(1)}=0$, $v_1^{(1)}=0$, $j=\sqrt{-1}$;

the received signals of the second sparse uniform subarray $\mathbb{V}_2$ being expressed by using another three-dimensional tensor $\mathcal{X}_2 \in \mathbb{C}^{N_x \times N_y \times L}$ as:

$$\mathcal{X}_2 = \sum_{k=1}^{K} a_{Nx}(\theta_k, \varphi_k) \circ a_{Ny}(\theta_k, \varphi_k) \circ s_k + \mathcal{N}_2,$$

wherein $\mathcal{N}_2$ denotes a noise tensor, and $a_{Nx}(\theta_k, \varphi_k)$ and $a_{Ny}(\theta_k, \varphi_k)$ denote steering vectors of the second sparse uniform subarray $\mathbb{V}_2$ in the x-axis and y-axis respectively, which are defined as:

$$a_{Nx}(\theta_k, \varphi_k) = \left[1, e^{-j\pi u_2^{(2)}\sin(\varphi_k)\cos(\theta_k)}, \ldots, e^{-j\pi u_2^{(N_x)}\sin(\varphi_k)\cos(\theta_k)}\right]^T,$$

$$a_{Ny}(\theta_k, \varphi_k) = \left[1, e^{-j\pi v_2^{(2)}\sin(\varphi_k)\sin(\theta_k)}, \ldots, e^{-j\pi v_2^{(N_y)}\sin(\varphi_k)\sin(\theta_k)}\right]^T,$$

wherein $u_2^{(i_3)}(i_3=1, 2, \ldots, N_x)$ and $v_2^{(i_4)}(i_4=1, 2, \ldots, N_y)$ denote positions of $i_3^{th}$ and $i_4^{th}$ physical sensors in the second sparse uniform subarray $\mathbb{V}_2$ in the x-axis and y-axis with $u_2^{(1)}=0$, $v_2^{(1)}=0$;

calculating a second-order cross-correlation tensor $\hat{\mathcal{R}} \in \mathbb{C}^{2M_x \times 2M_y \times N_x \times N_y}$ of two three-dimensional tensor signals $\mathcal{X}_1$ and $\mathcal{X}_2$:

$$\hat{\mathcal{R}} = \frac{1}{L}\sum_{l=1}^{L} \mathcal{X}_1(l) \circ \mathcal{X}_2^*(l),$$

wherein $\mathcal{X}_1(l)$ and $\mathcal{X}_2(l)$ denote an $l^{th}$ slice of $\mathcal{X}_1$ and $\mathcal{X}_2$ along a third dimension (i.e., a temporal dimension) respectively, and $(\cdot)^*$ denotes a conjugate operation;

(3) obtaining, by the receiver, an augmented discontinuous virtual planar array $\mathcal{S}$ based on the cross-correlation tensor $\hat{\mathcal{R}}$, wherein every element in the discontinuous virtual planar array $\mathcal{S}$ corresponds to a virtual sensor, and the position of each virtual sensor is defined as:

$\mathcal{S}=\{(-M_xn_xd+N_xm_xd,-M_yn_yd+N_ym_yd)|0\le n_x \le N_x-1,$
$0 \le m_x \le 2M_x-1, 0 \le n_y \le N_y-1, 0 \le m_y \le 2M_y-1\}$, wherein a spacing d is set to half of a signal wavelength) $\lambda$, i.e., $d=\lambda/2$; $\mathcal{S}$ comprises a virtual uniform planar array $\mathcal{W}$ including $(M_xN_x+M_x+N_x-1) \times (M_yN_y+M_y+N_y-1)$ virtual sensors with distributing from $(-N_x+1)d$ to $(M_xN_x+M_x-1)d$ and x-axis distributing from $(-N_y+1)d$ to $(M_yN_y+M_y-1)d$ in y-axis, the virtual uniform planar array $\mathcal{W}$ is defined as:

$\mathcal{W}=\{(x,y)|x=p_xd,y=p_yd,-N_x+1\le p_x \le M_xN_x+M_x-1,$
$-N_y+1 \le p_y \le M_yN_y+M_y-1\}$, defining dimension sets $\mathbb{J}_1=\{1, 3\}$ and $\mathbb{J}_2=\{2, 4\}$; and reshaping, by the receiver, cross-correlation tensor $\mathcal{R}$ (noiseless scene) with $\{\mathbb{J}_1, \mathbb{J}_2\}$ to obtain the equivalent second-order signals $U \in \mathbb{C}^{2M_xN_x \times 2M_yN_y}$ of the discontinuous virtual planar array $\mathcal{S}$, which is expressed as:

$$U \triangleq \mathcal{R}_{\{\mathbb{J}_1, \mathbb{J}_2\}} = \Sigma_{k=1}^K \sigma_k^2 a_x(\theta_k, \varphi_k) \circ a_y(\theta_k, \varphi_k),$$

wherein $a_x(\theta_k, \varphi_k) = a^*_{Nx}(\theta_k, \varphi_k) \otimes a_{Mx}(\theta_k, \varphi_k)$, $a_y(\theta_k, \varphi_k) = a^*_{Ny}(\theta_k, \varphi_k) \otimes a_{My}(\theta_k, \varphi_k)$ denote steering vectors of the augmented virtual planar array $\mathcal{S}$ along the x axis and the y axis, $\sigma_k^2$ denotes power of a $k^{th}$ source, and $\otimes$ denotes Kroneker product; an equivalent signal $\tilde{U} \in \mathbb{C}^{(M_xN_x+M_x+N_x-1) \times (M_yN_y+M_y+N_y-1)}$ of the virtual uniform planar array $\mathcal{W}$ is obtained by selecting elements in U corresponding to virtual sensor positions in $\mathcal{W}$ by the receiver, $\tilde{U}$ is modeled as:

$$\tilde{U} = \Sigma_{k=1}^K \sigma_k^2 b_x(\theta_k, \varphi_k) \circ b_y(\theta_k, \varphi_k),$$

wherein, $b_x(\theta_k, \varphi_k) = [e^{-j\pi(-N_x+1)sin(\varphi_k)cos(\theta_k)}, e^{-j\pi(-N_x+2)sin(\varphi_k)cos(\theta_k)}, \ldots, e^{-j\pi(M_xN_x+M_x-1)sin(\varphi_k)cos(\theta_k)}]$ and $b_y(\theta_k, \varphi_k) = [e^{-j\pi(-N_y+1)sin(\varphi_k)sin(\theta_k)}, e^{-j\pi(-N_y+2)sin(\varphi_k)sin(\theta_k)}, \ldots, e^{-j\pi(M_yN_y+M_y+1)sin(\varphi_k)sin(\theta_k)}]$ denote steering vectors of the virtual uniform planar array $\mathcal{W}$ along the x axis and the y axis;

(4) expanding, by the receiver, a symmetric part $\tilde{\mathcal{W}}$ of the virtual uniform planar array $\mathcal{W}$, the symmetric $\tilde{\mathcal{W}}$ being expressed as:

$$\tilde{\mathcal{W}} = \{(\tilde{x},\tilde{y}) | \tilde{x} = \tilde{p}_xd, \tilde{y} = \tilde{p}_yd, -M_xN_x-M_x+1 \leq \tilde{p}_x \leq N_x-1, -M_yN_y-M_y+1 \leq \tilde{p}_y \leq N_y-1\},$$

transforming elements in the equivalent received signal $\tilde{U}$ of the virtual uniform planar array $\mathcal{W}$ to obtain the equivalent signals $\tilde{U}_{sym} \in \mathbb{C}^{(M_xN_x+M_x+N_x-1) \times (M_yN_y+M_y+N_y-1)}$ of a symmetric uniform planar array $\tilde{\mathcal{W}}$ by the receiver, the equivalent signals $\tilde{U}_{sym}$ being expressed as:

$$\tilde{U}_{sym} = \Sigma_{k=1}^K \sigma_k^2 (b_x(\theta_k, \varphi_k) e^{(-M_xN_x-M_x+N_x)sin(\varphi_k)cos(\theta_k)}) \circ (b_y(\theta_k, \varphi_k) e^{(-M_yN_y-M_y+N_y)sin(\varphi_k)sin(\theta_k)}),$$

wherein $e^{(-M_xN_x-M_x+N_x)sin(\varphi_k)cos(\theta_k)}$ and $e^{(-M_yN_y-M_y+N_y)sin(\varphi_k)sin(\theta_k)}$ are symmetric factors in the x-axis and y-axis, respectively concatenating, by the receiver, the equivalent signals $\tilde{U}$ of the virtual uniform planar array $\mathcal{W}$ and the equivalent signals $\tilde{U}_{sym}$ of the symmetric uniform planar array $\tilde{\mathcal{W}}$ along the third dimension, to obtain a three-dimensional tensor $\mathcal{U} \in \mathbb{C}^{(M_xN_x+M_x+N_x-1) \times (M_yN_y+M_y+N_y-1) \times 2}$ for the coprime planar array, the three-dimensional coarray tensor $\mathcal{U}$ being expressed as:

$$\mathcal{U} = \sum_{k=1}^K \sigma_k^2 b_x(\theta_k, \varphi_k) \circ b_y(\theta_k, \varphi_k) \circ h_k(\theta_k, \varphi_k),$$

wherein $h_k(\theta_k, \varphi_k) = [1, e^{(-M_xN_x-M_x+N_x)sin(\varphi_k)cos(\theta_k)+(-M_yN_y-M_y+N_y)sin(\varphi_k)sin(\theta_k)}]^T$ denotes a symmetric factor vector;

(5) segmenting, by the receiver, a subarray with a size of $P_x \times P_y$ from the virtual uniform planar array $\mathcal{W}$, and dividing the virtual uniform planar array $\mathcal{W}$ into $L_x \times L_y$ partially overlapped uniform subarrays which are expressed as $\mathcal{W}_{(s_x,s_y)}$, $s_x=1, 2, \ldots, L_x$, $s_y=1, 2, \ldots, L_y$, wherein every element in the subarrays $\mathcal{W}_{(s_x,s_y)}$ corresponds to a virtual sensor, and the position of each virtual sensor in $\mathcal{W}_{(s_x,s_y)}$ is expressed as:

$$\mathcal{W}_{(s_x,s_y)} = \{(x,y) | x = p_xd, y = p_yd, -N_x+s_x \leq p_x \leq -N_x+s_x+P_x-1, -N_y+s_y \leq p_y \leq -N_y+s_y+P_y-1\},$$

obtaining, by the receiver, a sub-coarray tensor $\mathcal{U}_{(s_x,s_y)} \in \mathbb{C}^{P_x \times P_y \times 2}$ in the virtual subarray $\mathcal{W}_{(s_x,s_y)}$ by selecting elements in the coarray tensors $\mathcal{U}$ according to position of virtual sensors in the subarray $\mathcal{W}_{(s_x,s_y)}$:

$$\mathcal{U}_{(s_x,s_y)} = \Sigma_{k=1}^K \sigma_k^2 (c_x(\theta_k, \varphi_k) e^{(s_x-1)sin(\varphi_k)cos(\theta_k)}) \circ (c_y(\theta_k, \varphi_k) e^{(s_y-1)sin(\varphi_k)sin(\theta_k)}) \circ h_k(\theta_k, \varphi_k),$$

where $c_x(\theta_k, \varphi_k) = [e^{-j\pi(-N_x+1)sin(\varphi_k)cos(\theta_k)}, e^{-j\pi(-N_x+2)sin(\varphi_k)cos(\theta_k)}, \ldots, e^{-j\pi(-N_x+P_x)sin(\varphi_k)cos(\theta_k)}]$ and $c_y(\theta_k, \varphi_k) = [e^{-j\pi(-N_y+1)sin(\varphi_k)sin(\theta_k)}, e^{-j\pi(-N_y+2)sin(\varphi_k)sin(\theta_k)}, \ldots, e^{-j\pi(-N_y+P_y)sin(\varphi_k)sin(\theta_k)}]$ are steering vectors of a virtual subarray $\mathcal{W}_{(1,1)}$ along the x axis and the y axis; after the above operations, a total of $L_x \times L_y$ three-dimensional sub-coarray tensors $\mathcal{U}_{(s_x,s_y)}$ with dimensions being all $P_x \times P_y \times 2$ are obtained by the receiver; the sub-coarray tensors $\mathcal{U}_{(s_x,s_y)}$ with a same index subscript $s_y$ are concatenated by the receiver along a fourth dimension, to obtain $L_y$ four-dimensional tensors of size $P_x \times P_y \times 2 \times L_x$; and the $L_y$ four-dimensional tensors are further concatenated by the receiver along a fifth dimension, to obtain a five-dimensional tensor $\mathcal{T} \in \mathbb{C}^{P_x \times P_y \times 2 \times L_x \times L_y}$, the five-dimensional coarray tensor $\mathcal{T}$ is defined as:

$$\mathcal{T} = \Sigma_{k=1}^K \sigma_k^2 c_x(\theta_k, \varphi_k) \circ c_y(\theta_k, \varphi_k) \circ h_k(\theta_k, \varphi_k) \circ d_x(\theta_k, \varphi_k) \circ d_y(\theta_k, \varphi_k),$$

wherein $d_x(\theta_k, \varphi_k) = [1, e^{-j\pi sin(\varphi_k)cos(\theta_k)}, \ldots, e^{-j\pi(L_x-1)sin(\varphi_k)cos(\theta_k)}]$, $d_y(\theta_k, \varphi_k) = [1, e^{-j\pi sin(\varphi_k)sin(\theta_k)}, \ldots, e^{-j\pi(L_y-1)sin(\varphi_k)sin(\theta_k)}]$ are shifting factor vectors along the x-axis and y-axis respectively;

(6) reshaping, by the receiver, $\mathcal{T}$ with $\{\mathbb{K}_1, \mathbb{K}_2, \mathbb{K}_3\}$, $\mathbb{K}_1 = \{1,2\}$, $\mathbb{K}_2 = \{3\}$, $\mathbb{K}_3 = \{4,5\}$, i.e., combining first and second dimensions and fourth and fifth dimensions of the five-dimensional tensor $\mathcal{T}$, and retaining its third dimension, to obtain a three-dimensional structured coarray tensor $\mathcal{K} \in \mathbb{C}^{P_xP_y \times 2 \times L_xL_y}$ as follows:

$$\mathcal{K} \triangleq \mathcal{T}_{\{\mathbb{K}_1, \mathbb{K}_2, \mathbb{K}_3\}} = \Sigma_{k=1}^K \sigma_k^2 g(\theta_k, \varphi_k) \circ h(\theta_k, \varphi_k) \circ f(\theta_k, \varphi_k),$$

where $g(\theta_k, \varphi_k) = c_y(\theta_k, \varphi_k) \otimes c_x(\theta_k, \varphi_k)$, $f(\theta_k, \varphi_k) = d_y(\theta_k, \varphi_k) \otimes d_x(\theta_k, \varphi_k)$ represent the angular information and the shifting information, respectively;

(7) performing, by the receiver, CANDECOMP/PARACFAC decomposition on the three-dimensional structured coarray tensor $\mathcal{K}$, to obtain a closed-form solution of two-dimensional direction-of-arrivals in the underdetermined case.

2. The two-dimensional direction-of-arrival estimation method for a coprime planar array based on structured coarray tensor processing according to claim 1, wherein the receiver in step (1) is decomposed into two sparse uniform subarrays $\mathbb{V}_1$ and $\mathbb{V}_2$ on a coordinate system xoy, wherein $\mathbb{V}_1$ comprises $2M_x \times 2M_y$ sensors, the spacing in the x-axis direction and the spacing in the y-axis direction are $N_xd$ and $N_yd$, respectively, and sensor coordinates thereof on the xoy plane are $\{(N_xdm_x, N_ydm_y), m_x = 0,1, \ldots, 2M_x-1, m_y = 0, 1, \ldots, 2M_y-1\}$; $\mathbb{V}_2$ comprises $N_x \times N_y$ sensors, the spacing in the x-axis direction and the spacing in the y-axis direction are $M_x d$ and $M_y d$, respectively, and the sensor coordinates on the xoy plane are $\{(M_x d n_x, M_y d n_y), n_x=0, 1, \ldots, N_x-1, n_y=0, 1, \ldots, N_y-1\}$; $M_x$, $N_x$ and $M_y$, $N_y$ are a pair of coprime integers respectively, and $M_x<N_x$, $M_y<N_y$; overlapping, by the receiver, the subarrays $\mathbb{V}_1$ and $\mathbb{V}_2$ only at an origin of the coordinate system (0,0), to obtain a coprime planar array comprising $4M_x M_y + N_x N_y - 1$ physical sensors.

3. The two-dimensional direction-of-arrival estimation method for a coprime planar array based on structured coarray tensor processing according to claim 1, wherein the cross-correlation tensor $\hat{\mathcal{R}}$ in step (3) is ideally modeled (noiseless scene) at the receiver as:

$$\hat{\mathcal{R}} = \sum_{k=1}^{K} \sigma_k^2 a_{Mx}(\theta_k,\varphi_k) \circ a_{My}(\theta_k,\varphi_k) \circ a^*_{Nx}(\theta_k,\varphi_k) \circ a^*_{Ny}(\theta_k,\varphi_k),$$

$a_{Mx}(\theta_k,\varphi_k) \circ a^*_{Nx}(\theta_k,\varphi_k)$ in the cross-correlation tensor $\hat{\mathcal{R}}$ derives augmented coarray along the x axis, and $a_{My}(\theta_k,\varphi_k) \circ a^*_{Ny}(\theta_k,\varphi_k)$ derives an augmented coarray along the y axis, so as to obtain the augmented discontinuous virtual planar array $\mathcal{S}$.

4. The two-dimensional direction-of-arrival estimation method for a coprime planar array based on structured coarray tensor processing according to claim 1, wherein the equivalent signals of the symmetric $\tilde{\mathcal{W}}$ of the virtual uniform planar array $\mathcal{W}$ in step (4) is obtained by transformation of the equivalent signals $\tilde{U}$ of the virtual uniform planar array $\mathcal{W}$ by the receiver, which specifically comprises: performing, by the receiver, a conjugate operation on $\tilde{U}$ to obtain $\tilde{U}^*$, and flipping elements in $\tilde{U}^*$ left and right and then up and down, to obtain the equivalent signals $\tilde{U}_{sym}$ of the symmetric uniform planar array $\tilde{\mathcal{W}}$.

5. The two-dimensional direction-of-arrival estimation method for a coprime planar array based on structured coarray tensor processing according to claim 1, wherein said concatenating, by the receiver, the equivalent signals $\tilde{U}$ of the virtual uniform planar array $\mathcal{W}$ and the equivalent signals $\tilde{U}_{sym}$ of the symmetric uniform planar array $\tilde{\mathcal{W}}$ along the third dimension, to obtain a three-dimensional tensor $\mathcal{U}$ in step (4) comprises: performing, by the receiver, CANDECOMP/PARACFAC decomposition on $\mathcal{U}$ to achieve two-dimensional direction-of-arrival estimation in the overdetermined case.

6. The two-dimensional direction-of-arrival estimation method for a coprime planar array based on structured coarray tensor processing according to claim 1, wherein the step (7) comprises: performing, by the receiver, CANDECOMP/PARACFAC decomposition on the three-dimensional structured coarray tensor $\mathcal{K}$, to obtain three factor matrixes, $G=[g(\hat{\theta}_1,\hat{\varphi}_1), g(\hat{\theta}_2,\hat{\varphi}_2), \ldots, g(\hat{\theta}_K,\hat{\varphi}_K)]$
$H=[h(\hat{\theta}_1,\hat{\varphi}_1), h(\hat{\theta}_2,\hat{\varphi}_2), \ldots, h(\hat{\theta}_K,\hat{\varphi}_K)]$, $F=[f(\hat{\theta}_1,\hat{\varphi}_1), f(\hat{\theta}_2,\hat{\varphi}_2), \ldots, f(\hat{\theta}_K,\hat{\varphi}_K)]$;

wherein $(\hat{\theta}_K,\hat{\varphi}_K)$, $k=1, 2, \ldots, K$ is an estimation of $(\theta_K,\varphi_K)$, $k=1, 2, \ldots, K$; dividing, by the receiver, elements in a second row in the factor matrix G by elements in a first row to obtain $e^{-j\pi \sin(\hat{\varphi}_k)\cos(\hat{\theta}_k)}$; dividing, by the receiver, elements in the $P_x+1^{th}$ row in the factor matrix G by elements in the first row to obtain $e^{-j\pi \sin(\hat{\varphi}_k)\sin(\hat{\theta}_k)}$, after a similar parameter retrieval operation on the factor matrix F, averaging and logarithm processing being performed to parameters extracted from G and F, respectively, to obtain $\hat{u}_k = \sin(\hat{\varphi}_k)\cos(\hat{\theta}_k)$ and $\hat{v}_k = \sin(\hat{\varphi}_k)\sin(\hat{\theta}_k)$; and obtaining, by the receive end, closed-form solution of the two-dimensional azimuth and elevation angles $(\hat{\theta}_K,\hat{\varphi}_K)$ as follows:

$$\hat{\theta}_k = \arctan\left(\frac{\hat{v}_k}{\hat{u}_k}\right),$$

$$\hat{\varphi}_k = \sqrt{\hat{v}_k^2 + \hat{u}_k^2}.$$

in the above step, CANDECOMP/PARAFAC decomposition follows a uniqueness condition:

$k_{rank}(G) + k_{rank}(H) + k_{rank}(F) \geq 2K+2,$ wherein $k_{rank}(\bullet)$ denotes a Kruskal rank of a matrix, and $k_{rank}(G) = \min(P_x P_y, K)$, $k_{rank}(H) = \min(L_x, L_y, K)$, $k_{rank}(F) = \min(2,K)$, $\min(\bullet)$ denotes a minimization operation;

optimal $P_x$ and $P_y$ values are obtained by the receiver according to the above inequality, so as to obtain a theoretical maximum value of K, i.e., a theoretical upper bound of the number of distinguishable sources, is obtained by ensuring that the uniqueness condition is satisfied; the value of K exceeds the total number of physical sensors in the coprime planar array $4M_x M_y + N_x N_y - 1$.

* * * * *